(12) United States Patent
McDonough

(10) Patent No.: US 7,120,186 B2
(45) Date of Patent: Oct. 10, 2006

(54) METHODS AND APPARATUS FOR USE IN GENERATING DATA SEQUENCES FOR SPREAD SPECTRUM COMMUNICATIONS

(75) Inventor: John G. McDonough, La Jolla, CA (US)

(73) Assignee: Texas Instruments Incorporated, Dallas, TX (US)

( * ) Notice: Subject to any disclaimer, the term of this patent is extended or adjusted under 35 U.S.C. 154(b) by 682 days.

(21) Appl. No.: 09/955,534

(22) Filed: Sep. 18, 2001

(65) Prior Publication Data
US 2003/0053518 A1  Mar. 20, 2003

(51) Int. Cl.
*H04B 1/69* (2006.01)
(52) U.S. Cl. ............... 375/130; 375/143; 375/150; 375/152
(58) Field of Classification Search ............ 375/130, 375/139, 142, 143, 150, 152, 343, 135, 146; 708/250, 314, 316, 410, 422, 426; 714/775, 714/776, 777
See application file for complete search history.

(56) References Cited
U.S. PATENT DOCUMENTS 5,311,176 A * 5/1994 Gurney ................. 341/50
6,452,959 B1 * 9/2002 McDonough ............. 375/130
6,549,563 B1 * 4/2003 McDonough ............. 375/140
6,556,555 B1 * 4/2003 Miller et al. ............. 370/335
6,625,199 B1 * 9/2003 McDonough ............. 375/140
6,650,687 B1 * 11/2003 McDonough ............. 375/140

* cited by examiner

*Primary Examiner*—Khanh Tran
*Assistant Examiner*—Sam K. Ahn
(74) *Attorney, Agent, or Firm*—Ronald O. Neerings; Wade J. Brady, III; Frederick J. Telecky, Jr.

(57) ABSTRACT

Methods and apparatus for use in generating data sequences for direct sequence spread spectrum (DSSS) communications are described. One exemplary method includes the steps of serially generating a pseudo random noise (PN) sequence by, for each count value i of a plurality of count values, retrieving from memory a bit of the PN sequence corresponding to the (i)th position in the PN sequence. The exemplary method includes the further steps of serially generating a Gold code sequence by, for each count value i of the plurality of count values, retrieving from memory a bit of the PN sequence corresponding to the (i+n)th position in the PN sequence, retrieving from memory a bit of the PN sequence corresponding to the (q*i)th position in the PN sequence, and adding the bit corresponding to the (i+n)th position with the bit corresponding to the (q*i)th position.

19 Claims, 4 Drawing Sheets

METHODS AND APPARATUS FOR USE IN GENERATING DATA SEQUENCES FOR SPREAD SPECTRUM COMMUNICATIONS

BACKGROUND OF THE INVENTION

1. Field of the Invention

The present invention relates generally to the field of wireless communications, and more particularly to the field of spread spectrum communications.

2. Description of the Related Art

Direct Sequence Spread Spectrum (DSSS) receivers have traditionally been capable of demodulation in only a single or perhaps a few modes of operation and do not typically have the flexibility to accommodate the variety of spreading, modulation and coding schemes supported by the current invention. For example, mobile station receivers compliant with the TIA/EIA-IS-95-B standard are required to generate only a single set of modified ML sequences for de-spreading purposes.

As is well known in the art, maximal length (ML) sequences are traditionally generated with pseudorandom noise (PN) generators that make use of Linear Feedback Shift Registers (LFSRs). An LFSR has a shift register of N stages and intervening exclusive-OR gates for programming a specific PN sequence. A subset of the PN sequences generated by an N-stage LFSR are characterized as ML PN sequences, and are of length $2^N-1$.

Gold code sequences are also traditionally generated with LFSR based circuits as described in "Spreading Codes for Direct Sequence CDMA and Wideband CDMA Cellular Networks" by Esmael H. Dinan and Bijan Jabbari, published in the IEEE Communications Magazine, September 1999. Note that in this description, Gold codes are generated using two LFSRs which generate related ML sequences ("Related Sequences"), where such Related Sequences are such that a second of such sequences is a decimated by "q" version of the first of such sequences. Note also in such description that a first of such Related Sequences is added modulo two to shifted version(s) of a second of such Related Sequences to generate a Gold code or set of Gold codes for the particular Related Sequences.

SUMMARY OF THE INVENTION

Methods and apparatus for use in generating data sequences for direct sequence spread spectrum (DSSS) communications are disclosed. One exemplary method includes the steps of serially generating a pseudorandom noise (PN) sequence by, for each count value i of a plurality of count values, retrieving from memory a bit of the PN sequence corresponding to the (i)th position in the PN sequence. The exemplary method includes the further steps of serially generating a Gold code sequence by, for each count value i of the plurality of count values, retrieving from memory a bit of the PN sequence corresponding to the (i+n)th position in the PN sequence, retrieving from memory a bit of the PN sequence corresponding to the (q*i)th position in the PN sequence, and adding the bit corresponding to the (i+n)th position with the bit corresponding to the (q*i)th position.

DETAILED DESCRIPTION OF THE PREFERRED EMBODIMENTS

In modern DS SS communication systems, the spreading, modulation and coding schemes used may vary from one operational mode to another and from one network to another. In addition, certain communications devices may be required to operate across multiple networks that have adopted different and perhaps incompatible communications systems (i.e., multi-mode operation). As it is desired to build receivers which may operate in a multitude of modes and within multiple networks and systems, a flexible and modular method and apparatus for sequence generation is desired which will accommodate these many spreading, modulation and coding schemes in an efficient manner (e.g., having significant sharing of hardware and software resources between the various modes of operation and between the various systems). In particular the ability to efficiently generate maximal length (ML) sequences used in certain communications systems and Gold code sequences used in certain other communications systems is desirable.

A sequence generation apparatus with the flexibility to accommodate a variety of spreading, modulation and coding schemes under control of a Controller has been invented. This sequence generation apparatus is capable of generating the single set of modified ML sequences required for TIA/EIA-IS-95-B and IS-2000 compliant receivers. This sequence generation apparatus is also capable of generating the Gold code sequences required for UMTS compliant receivers. This sequence generation apparatus is also capable of generating sequences required for receivers compliant with other communications standards. In a preferred embodiment, described below, the apparatus is capable of efficiently generating both ML sequences and Gold code sequences.

Figure 1:
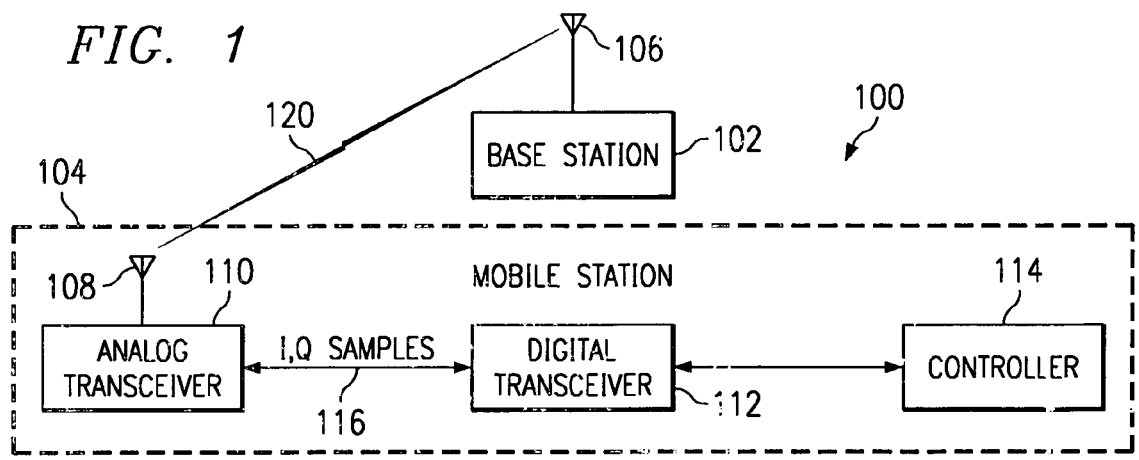
FIG. 1 is a schematic block diagram of a communication system that may embody the present invention.

The inventive aspects are now described in more detail with reference to the drawings. FIG. 1 shows a block diagram of a communication system 100 that may embody the present invention. In this embodiment, communication system 100 is a code division multiple access (CDMA) communication system using direct sequence spread spectrum (DSSS) techniques. Communication system 100 includes one or more base stations, such as a base station 102, and one or more mobile stations, such as a mobile station 104. Mobile station 104 is a type of portable electronic device, which may be battery-operated, providing for wireless communications. Mobile station 104 includes an antenna 108 coupled to an analog transceiver 110, a digital transceiver 112 coupled to analog transceiver 110, and a controller 114. Base station 102 has an antenna 106 and other conventional components for communication.

Analog transceiver 110 of mobile station 104 employs conventional techniques for signal reception and transmission. During reception, analog transceiver 110 receives DSSS signals via antenna 108 for demodulation into I (in-phase) and Q (quadrature) signal samples. These signals are passed to digital transceiver 112 for further signal demodulation. During transmission, digital transceiver 112 encodes I and Q signals appropriately, which are passed to analog transceiver 110 for modulation and transmission via antenna 108. Controller 114 controls these and other functions of mobile station 104, as will be described below. Although controller 114 may be any device suitable for such purpose, it is preferably a microprocessor, a digital signal processor (DSP), or a combination of the above, having at least one central processing unit (CPU) and associated software or firmware. Preferably, substantially all of the components described in connection with digital transceiver 112 and controller 114 are manufactured in a single integrated circuit (IC) and coupled to a substrate such as a printed circuit board (PCB) in mobile station 104.

Figure 2:
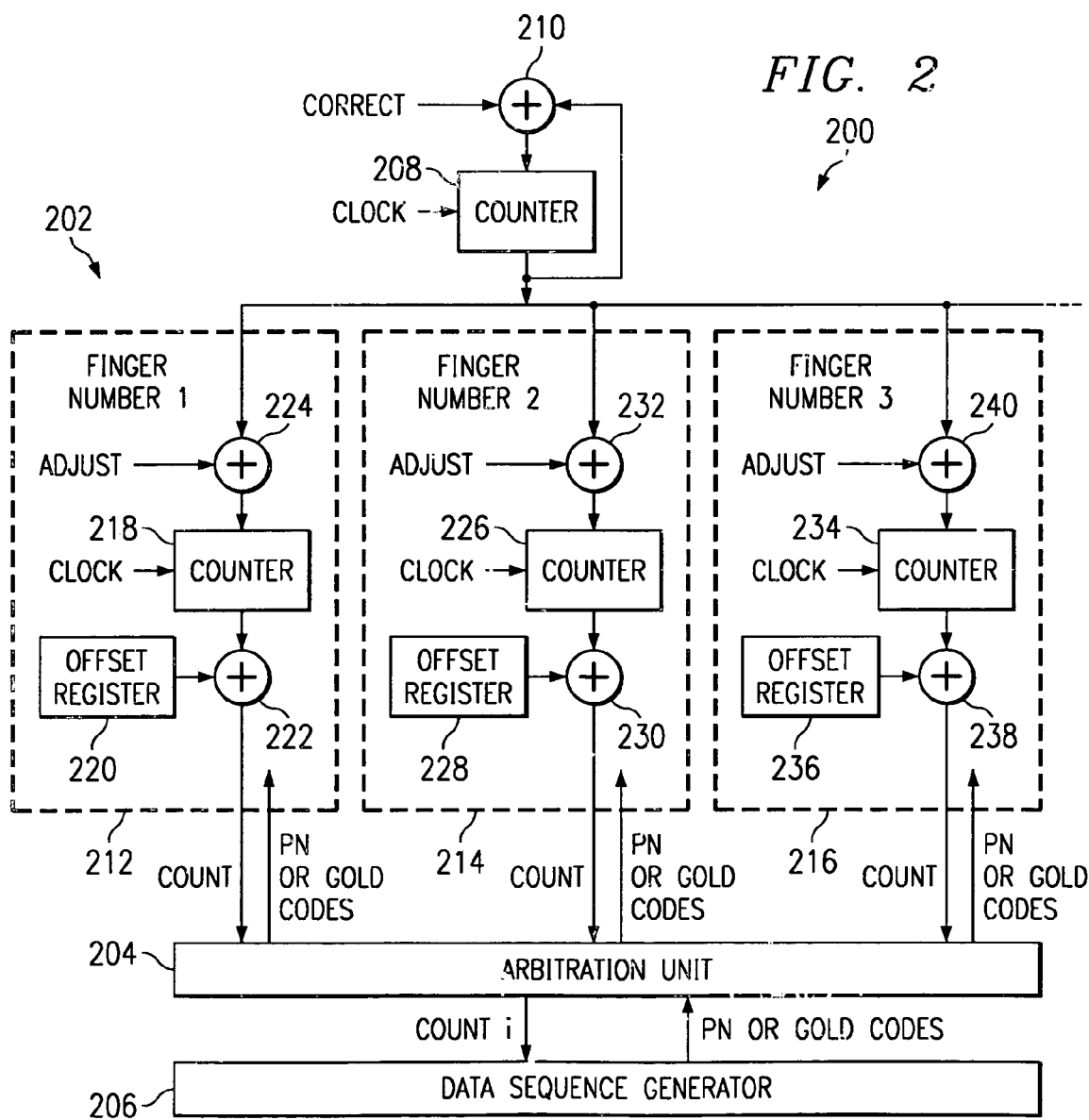
FIG. 2 is a schematic diagram of a relevant portion of a mobile station in the communication system of FIG. 1.

FIG. 2 shows a schematic block diagram of pertinent circuitry 200 of the digital transceiver. Circuitry 200 includes a plurality of demodulating receiver fingers 202 (pertinent portions of which are illustrated), an arbitration unit 204, and a data sequence generator 206. Circuitry 200 also includes a master binary counter 208.

Although any suitable number of demodulating receiver fingers may be utilized, FIG. 2 shows three demodulating receiver fingers 212, 214, and 216. Each one of receiver fingers 202 includes a slave binary counter, two modulo-2 adders, and an offset register. For example, receiver finger 212 includes a counter 218, an offset register 220, an adder 222, and an adder 224; receiver finger 214 includes a counter 226, an offset register 228, an adder 230, and an adder 232; and receiver finger 216 includes a counter 234, an offset register 236, an adder 238, and an adder 240.

It is now shown that the present invention provides a method for the generation of the ML sequences through sequential access to a storage device and provides a method for the generation of the Gold code sequences through a combination of sequential and non-sequential access to such a storage device. The present invention makes no use of the LFSRs traditionally used to generate such sequences. Clearly, such sequence manipulations as decimation and shifting are easily accomplished when such sequences to be manipulated are stored in a randomly accessible storage device such as a ROM.

Assume that $x(i)$ and $y(i)$ are two Related Sequences. Then $Zn(i)=x(i+n)+y(i)$ is one Gold code sequence among a set of Gold code sequences associated with such Related Sequences. Typically, this would be referred to as the nth Gold code sequence. Because $y(i)$ is related to $x(i)$ as follows:

$$y(i)=x(q*i+k) \text{ for some } q, \text{ where } k=0, 1, 2 \ldots,$$

the above equation for $Zn(i)$ may be re-written as follows:

$$Zn(i)=x(i+n)+x(q*i+k)$$

For simplicity, we will assume k=0 for the following discussion. Now we assume that the ML sequence x is stored sequentially as $x(0), x(1), \ldots$ in a storage device. Therefore, it is seen that the nth Gold code sequence $Zn(i)$ may be generated by: (i) accessing such storage device in a sequential manner starting from location n in order to generate the sequence $x(i+n)$, (ii) accessing such same storage device in a non-sequential manner starting from location 0 and accessing each qth location in order to generate the sequence $x(q*i)$, and (iii) adding on a bit-by-bit basis the resulting two retrieved sequences $x(i+n)$ and $x(q*i)$.

Figure 3:
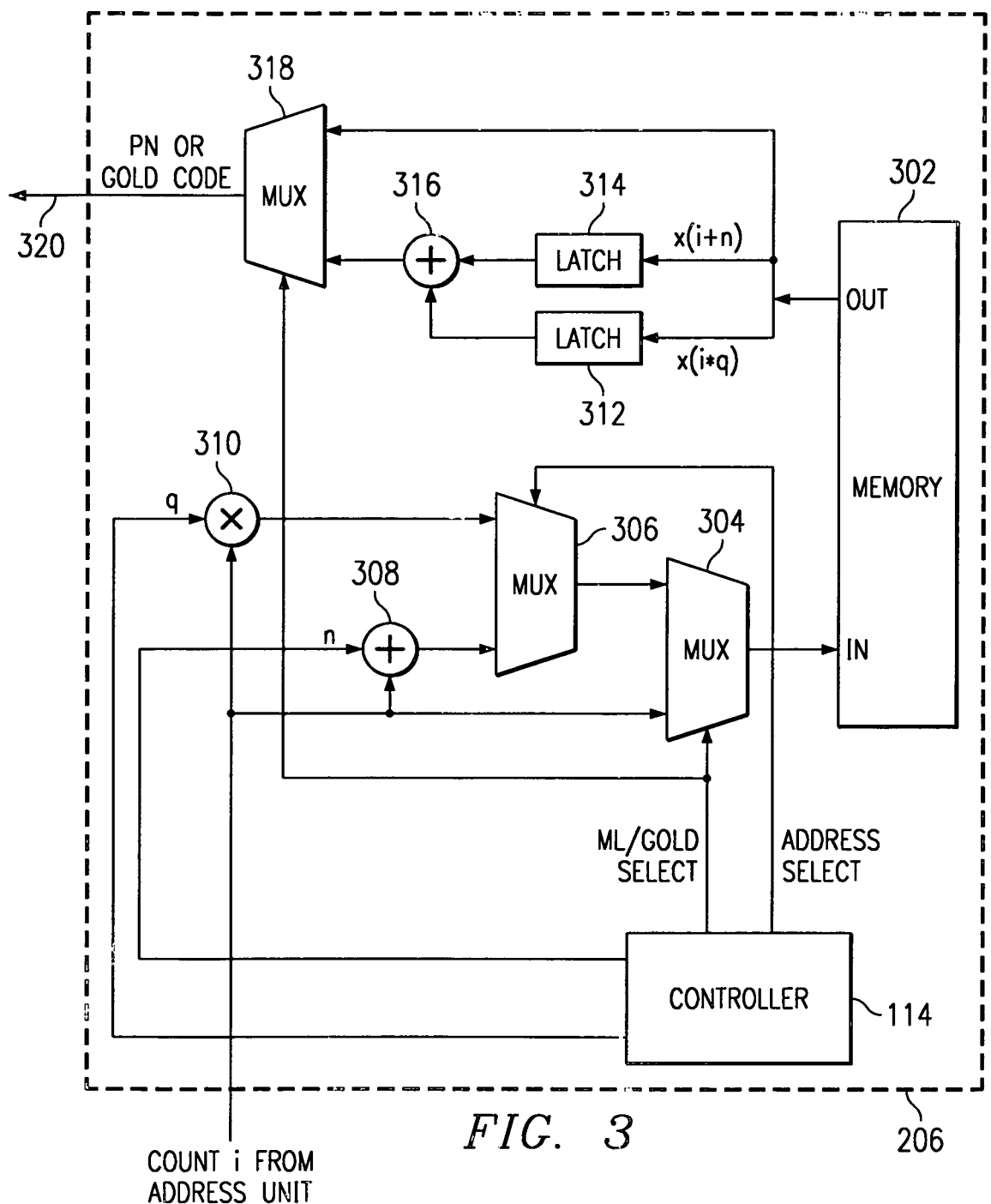
FIG. 3 is a schematic diagram of a data sequence generator of the mobile station in FIG. 2 in accordance with the invention.

Referring now to FIG. 3, before Gold sequences are to be generated, controller 114 sets the "ML or Gold sequence select" (hereinafter "ML/Gold select") line such that MUX 304 provides the output of MUX 306 and MUX 318 provides the output of adder 316. Before ML sequences are to be generated, controller 114 sets the ML/Gold select line such that MUX 304 provides "i" from Address Unit (not shown) and MUX 318 provides the output from from memory 302 that stores the ML Sequences. When Gold sequences are generated, Controller first sets "address select" such that MUX 306 provides the output of adder 308, and $x(i+n)$ is accessed and latched into latch 314. Controller 114 next sets the "address select" line such that MUX 306 provides the output of multiplier 310, and $x(qi)$ is accessed and latched into latch 312. Next, the output of adder 316 $(Zn(i))$ is provided to the Sequence Sink (not shown) through MUX 318. When ML sequences are generated, $x(i)$ is accessed and provided to the Sequence Sink through MUX 318.

For the generation of Gold code sequences applicable to the Universal Mobile Telephone Service (UMTS) standard, as described in "3GPPI—TS 25.213 v2.4.0 section 5.2.2" further features of the present invention are used as described below. Assume that $x(i)$ and $y(i)$ are two Related Sequences.

Then $Z2n(i)=x(i+n)+y(i)+j[x(i+n+m)+y(i+m)]$ defines complex sequences ("complex Gold code sequences") each consisting of two real Gold code sequences. Such complex Gold code sequences are applicable to the UMTS standard. Because $y(i)$ is related to $x(i)$ as follows:

$$y(i)=x(qi) \text{ for some } q$$

the above equation for $Z2n(i)$ may be re-written as follows:

$$Z2n(i)=x(i+n)+x(q*i)+j[x(i+n+m)+x(q*i+q*m)]$$

Figure 4:
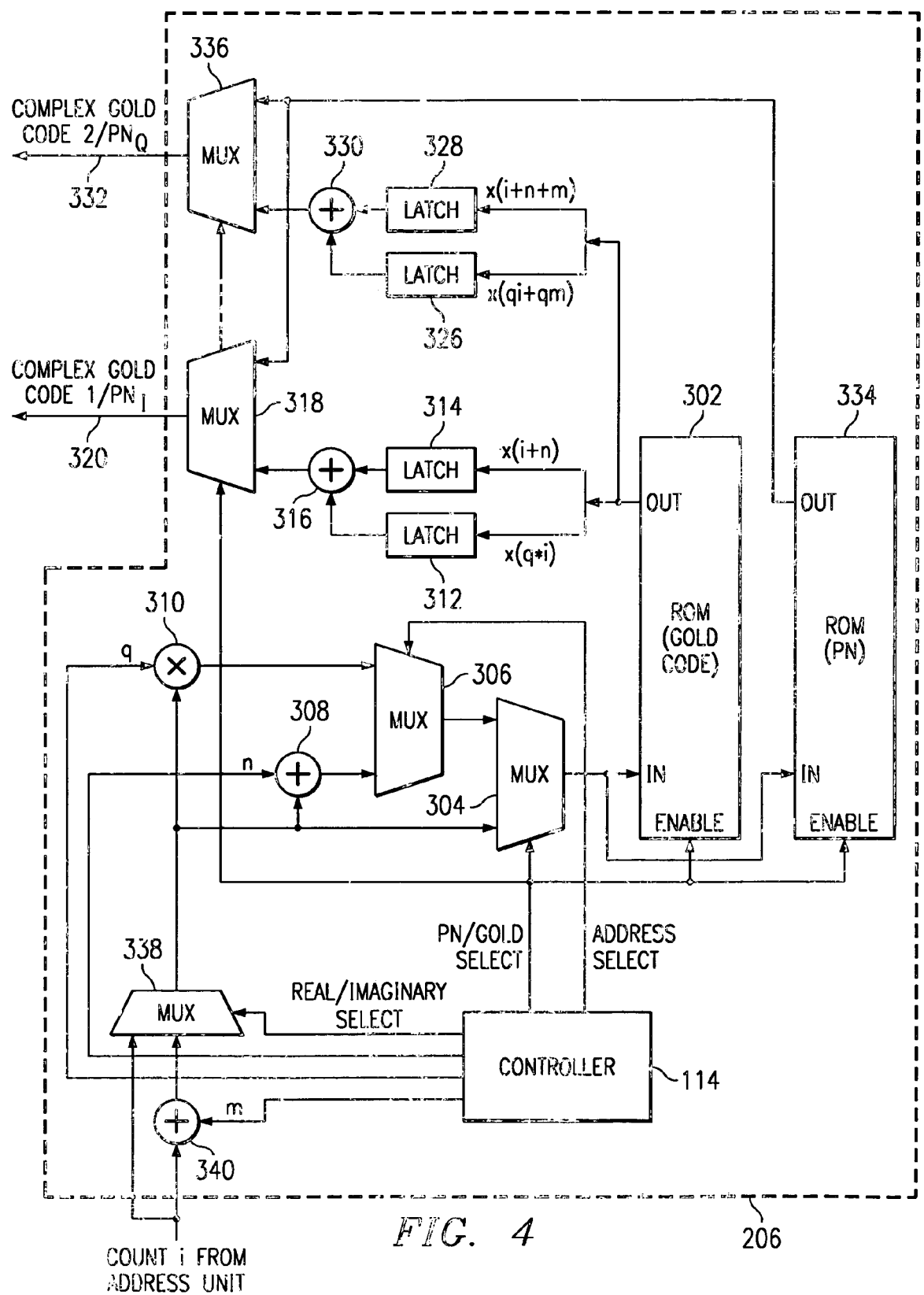
FIG. 4 is a schematic diagram of an alternate embodiment of the data sequence generator in accordance with the invention.

Referring now to FIG. 4, controller 114 provides the value "m" to adder 340, where 2M-1 is equal to the length of each related Sequence. Mux 338 which is under the control of controller 114 via the Real/imaginary select signal provides "i" or "i+m" value to input of MUX 304. In FIG. 4, there is shown a block diagram of a circuit for complex pair Gold code sequence and complex pair ML sequence generation. A ROM 302 provides data storage for Gold code generation and a second ROM 334 provides storage for the ML sequence generation. Before complex Gold code sequences are to be generated, controller 114 sets the ML/Gold select line such that MUX 304 provides the output of MUX 306, MUX 318 provides the output of adder 316, and MUX 336 provides the output of adder 330. Before ML sequences are to be generated, controller 114 sets the ML/Gold select line such that MUX 304 provides the output of MUX 338. Controller 114 sets the Real/imaginary select signal such that MUX 338 provides "i" from the Address Unit (not shown). MUX 318 provides the output of ROM 334 and MUX 336 provides the output of ROM 334. When complex Gold sequences are generated, controller 114 first sets the "address select" line such that MUX 306 provides the output of adder 308, $x(i+n)$ and $x(i+n+m)$ are accessed and latched into latch 314 and latch 328 respectively. Controller 114 next sets "address select" such that MUX 306 provides the output of multiplier 310, $x(q*i)$ and $x(q*i+q*m)$ are accessed and latched into latch 312 and latch 326 respectively. Next the output of adder 316 $(\text{Real}\{Z2n(i)\})$ is provided to the Sequence Sink (not shown) through MUX 318 and the output of adder 330 $(\text{Imag}\{Z2n(i)\})$ is provided to the Sequence Sink (not shown) through MUX 336. When complex ML sequences are generated, $x(i)$ is accessed and provided to the Sequence Sink (not shown) through MUX 318 and MUX 336.

Figure 5:
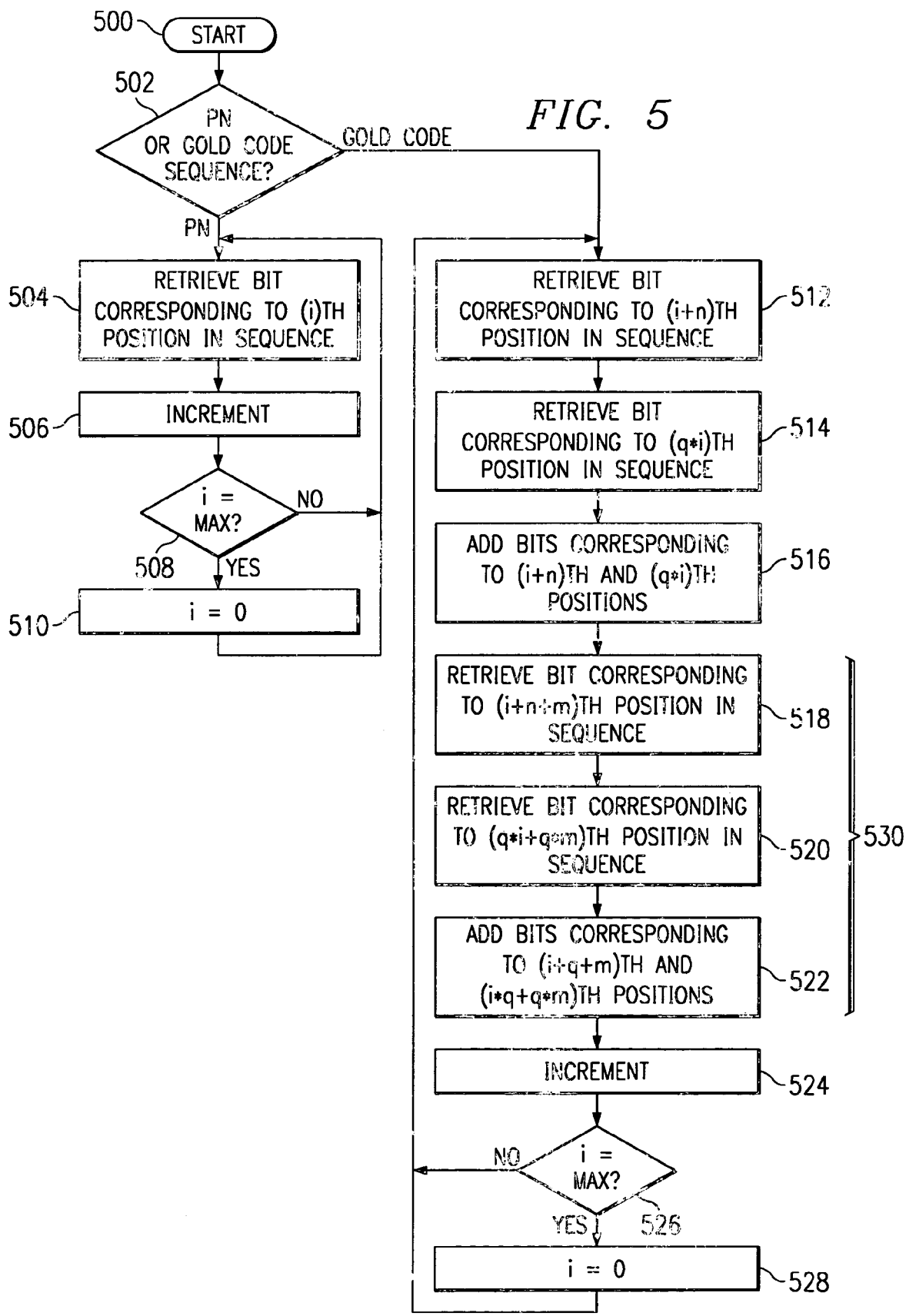
FIG. 5 is a flowchart describing a method of generating data sequences for spread spectrum communications.

In FIG. 5 a flowchart highlighting some of the steps taken in accordance with the invention is shown. In step 502, the method determines if a ML or Gold code sequence is desired. If it is determined that it is a ML sequence, then in step 504, the bit corresponding to the (i)th position is retrieved. In step 506, "i" is incremented and in step 508 it is determined if "i" is equal to the maximum value. If "i" is at maximum, then in step 510 "i" is set to zero, and the routine returns to step 504. While if in step 508 it is determined that "i" is not equal to the maximum value then the routine returns to step 504.

If in step 502 it is determined that it is a Gold code, in step 512 the bit corresponding to the (i+n) position in the sequence is retrieved. In step 514, the bit corresponding to the (q*i)th position in the sequence is retrieved. Then in step 516, the bits corresponding to the (i+n)th position and the bits corresponding to the (q*i)th position are added modulo two.

In section 530 of the method, a modified Gold code sequence is generated, with step 518 causing the bit corresponding to (i+n+m)th position in the sequence to be retrieved. In step 520, the bit corresponding to the (q*i+q*m)th position is retrieved and in step 522 the bits corresponding to the to (i+n+m)th position and the (q*i+q*m)th position are added modulo two.

In step 524, "i" is incremented and in step 526 it is determined if "i" has reached the maximum value. If "i" is at maximum in step 526, then in step 528, "i" is set to zero and the routine returns to step 512. If "i" is not equal to the maximum value, the routine returns to step 512.

DS SS receivers have traditionally been capable of demodulation in only a single or perhaps a few modes of operation and do not typically have the flexibility to accommodate the variety of spreading, modulation and coding schemes supported by the current invention. For example, mobile station receivers compliant with the TIA/EIA-IS-95-B standard are required to generate only a single set of modified ML sequences for de-spreading purposes.

Receivers compliant with both the IS-2000 standard and the UMTS standard are considered highly complex and methods of reducing such complexity are of great interest. Such mobile station receivers compliant with both the IS-2000 standard and the UMTS standard will be required to de-spread received DS SS waveforms using both ML sequences and Gold code sequences. The current invention provides an efficient method and apparatus for generating sequences required for de-spreading operations of multiple incompatible systems, providing for the multi-mode capability described above.

The present invention provides an efficient means of generating Gold code sequences. The sequence manipulations of decimation and shifting required for Gold code sequence generation are easily accomplished when such sequences to be manipulated are stored in a randomly accessible storage device such as that of the present invention.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for use in generating one or more data sequences for spread spectrum communications, the method comprising:

serially generating a Gold code sequence by, for each count value i of a plurality of count values:
retrieving from memory a bit of a pseudorandom noise (PN) sequence corresponding to an (i+n)th position in the PN sequence, where n is a fixed integer value;
retrieving from memory a bit of the PN sequence corresponding to an (q*i)th position in the PN sequence, where q is a fixed integer value;
adding the bit corresponding to the (i+n)th position with the bit corresponding to the (q*i)th position; and
wherein, for serially generating the Gold code sequence, the method further comprises multiplying q and the count value i for each count value i of the plurality of count values.

2. The method according to claim 1, further comprising:
wherein the memory comprises a read-only memory (ROM).

3. The method according to claim 1 wherein, for serially generating the Gold code sequence, the method further comprising:
adding the fixed integer value n and the count value i for each count value i of the plurality of count values.

4. A method for use in generating one or more data sequences for spread spectrum communications, the method comprising:

serially generating a Gold code sequence by, for each count value i of a plurality of count values:
retrieving from memory a bit of a pseudorandom noise (PN) sequence corresponding to an (i+n)th position in the PN sequence, where n is a fixed integer value;
retrieving from memory a bit of the PN sequence corresponding to an (q*i)th position in the PN sequence, where q is a fixed integer value;
adding the bit corresponding to the (i+n)th position with the bit corresponding to the (q*i)th position; and
wherein retrieving from memory a bit of the PN sequence corresponding to the (i+n)th position comprises applying an (i+n) value to the address inputs of the memory; and
wherein retrieving from memory a bit of the PN sequence corresponding to the (q*i)th position comprises applying an (q*i) value to the address inputs of the memory.

5. A method for use in generating one or more data sequences for spread spectrum communications, the method comprising:

serially generating a Gold code sequence by, for each count value i of a plurality of count values:
retrieving from memory a bit of a pseudorandom noise (PN) sequence corresponding to an (i+n)th position in the PN sequence, where n is a fixed integer value;
retrieving from memory a bit of the PN sequence corresponding to an (q*i)th position in the PN sequence, where q is a fixed integer value;
adding the bit corresponding to the (i+n)th position with the bit corresponding to the (q*i)th position; and
wherein the Gold code sequence is a first Gold code sequence, the method further comprising serially generating a second Gold code sequence by, for each count value i of the plurality of count values;

retrieving from memory a bit of the PN sequence corresponding to the (i+n+m)th position in the PN sequence, where "m" is a fixed integer value;

retrieving from memory a bit of the PN sequence corresponding to the (q*i+q*m)th position in the PN sequence; and adding the bit corresponding to the (i+n+m)th position with the bit corresponding to the (q*i+q*m)th position.

6. In a dual mode Code Division Multiple Access (CDMA), a method for generating an nth Gold code from a pseudorandom noise (PN) sequence stored sequentially in a memory as x(0), x(1), . . . , the method comprising the steps of:

accessing the memory sequentially starting from location n in order to generate the sequence x(i+n), where n is a fixed integer value;

accessing the memory non-sequentially starting from a first location (k) and then accessing each qth location in order to generate the sequence x(q*i+k) where q is a fixed integer value; and adding on a bit-by-bit basis the resulting two retrieved sequences x(i+n) and x(q*i+k).

7. A method of generating a complex Gold Code sequence, Z2n(i), where, x is a PN sequence stored sequentially as x(0), x(1), . . . , in a memory, the PN sequence having a length equal to 2M-1, the method comprising the steps of:

accessing from the memory in sequences of x(i+n+m), x(q*i+q*m), x(i+n) and x(q*i); and performing the equation:

$$Z2n(i)=x(i+n)+x(q*i)+j[x(i+n+m)+x(q*i+q*m)]$$

where, n and q are fixed integer values to produce the complex Gold Code sequence, and M, n and i are integer values.

8. A data sequence generator for serially generating one or more data sequences, the data sequence generator comprising:

a memory;

data stored in said memory;

the data comprising a pseudo-random noise (PN) sequence;

a counting device;

a first adder, including:
a first input coupled to an output of the counting device;
a second input which receives a value n, wherein n is an integer value;

a multiplier, including:
a first input coupled to the output of the counting device;
a second input which receives a value q, wherein q is an integer value;

a first multiplexer, including:
a first input coupled to an output of the first adder;
a second input coupled to an output of the multiplier; and
an output for coupling to memory address inputs of the memory.

9. The data sequence generator according to claim 8, wherein the memory comprises a read-only memory (ROM).

10. The data sequence generator according to claim 8, further comprising:
an output of the memory to provide serially-generated PN sequences responsive to the counting device.

11. The data sequence generator according to claim 8, further comprising:
a first latch having an input coupled to an output of the memory;
a second latch having an input coupled to the output of the memory;
a second adder, including:
a first input coupled to an output of the first latch;
a second input coupled to an output of the second latch; and
an output to provide a serially-generated Gold code sequence.

12. The data sequence generator according to claim 8, further comprising:
a second multiplexer, including:
a first input coupled to the output of the first multiplexer;
a second input coupled to the output of the counting device; and an output coupled to an address input of the memory.

13. The data sequence generator according to claim 8, further comprising:
a first latch having an input coupled to an output of the memory;
a second latch having an input coupled to the output of the memory;
a second adder, including:
a first input coupled to an output of the first latch;
a second input coupled to an output of the second latch;
an output to provide a serially-generated Gold code sequence;
a second multiplexer, including:
a first input coupled to the output of the second adder;
a second input coupled to the output of the memory; and
an output to provide, in a time-multiplexed fashion the serially-generated PN sequence and the serially-generated Gold code sequence.

14. The data sequence generator according to claim 8, further comprising:
a second multiplexer, including:
a first input coupled to the output of the first multiplexer;
a second input coupled to the output of the counting device;
an output coupled to an address input of the memory;
a first latch having an input coupled to an output of the memory;
a second latch having an input coupled to the output of the memory;
a second adder, including:
a first input coupled to an output of the first latch;
a second input coupled to an output of the second latch;
an output to provide a serially-generated Gold code sequence;
a third multiplexer, including:
a first input coupled to the output of the second adder;
a second input coupled to the output of the memory; and
an output to provide, in a time-multiplexed fashion, a serially-generated PN sequence and a serially-generated Gold code sequence.

15. A data sequence generator, comprising:
a read-only memory (ROM) storing a pseudo-random noise (PN) sequence;
a counter;

a first adder, including:
  a first input coupled to the output of the counter;
  a second input which receives a value n, wherein n is an integer;
a multiplier, including:
  a first input coupled to the output of the counter;
  a second input which receives a value q, wherein q is an integer;
a first multiplexer, including:
  a first input coupled to an output of the first adder;
  a second input coupled to an output of the multiplier;
a second multiplexer, including:
  a first input coupled to an output of the first multiplexer;
  a second input coupled to the output of the counter; and
  an output of the second multiplexer coupled to an address input of the ROM.

16. The data sequence generator according to claim 15, further comprising:
  a first latch coupled to an output of the ROM;
  a second latch coupled to the output of the ROM;
  a second adder, including:
    a first input coupled to an output of the first latch;
    a second input coupled to an output of the second latch; and
    an output to provide a Gold Code sequence.

17. The data sequence generator according to claim 15, further comprising:
  a first latch coupled to an output of the ROM;
  a second latch coupled to the output of the ROM;
  a second adder, including:
    a first input coupled to an output of the first latch;
    a second input coupled to an output of the second latch;
  a third multiplexer, including:
    a first input coupled to the output of the ROM;
    a second input coupled to an output of the second adder; and
    an output to selectively provide the PN sequence and a Gold Code sequence.

18. The data sequence generator according to claim 17, wherein the ROM comprises a first ROM and a second ROM and the output of the second multiplexer is coupled to memory address inputs of both the first and the second ROM;
  a first PN sequence is stored in the first ROM and a second PN sequence is stored in the second ROM;
  the first and second latches are coupled to the output of the first ROM; and
  the first input of the third multiplexer is coupled to the output of the second ROM.

19. A data sequence generator for use in direct sequence spread spectrum (DSSS) communications, comprising:
  memory;
  a pseudo-random noise (PN) sequence stored in the memory;
  a counter for use in generating each count value i of a plurality of count values;
  an output of the memory to provide, for each count value i received at memory address inputs, a bit of the PN sequence corresponding to the (i)th position in the PN sequence, where n is a fixed integer value;
  an output of the memory to provide, for each (i+n) value received at the memory address inputs, a bit of the PN sequence corresponding to the (i+n)th position in the PN sequence, where q is a fixed integer value;
  an output of the memory to provide, for each (q*i) value received at the memory address inputs, a bit of the PN sequence corresponding to the (q*i)th position in the PN sequence; and
  an adder to provide a sum of the bit corresponding to the (i+n)th position and the bit corresponding to the (q*i)th position, to thereby provide a Gold code sequence.

* * * * *